United States Patent
DeLuca et al.

(10) Patent No.: US 10,904,176 B2
(45) Date of Patent: Jan. 26, 2021

(54) DETERMINATION OF MESSAGE TYPE BASED ON EXTERNAL FACTORS

(71) Applicant: International Business Machines Corporation, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 159 days.

(21) Appl. No.: 15/810,698

(22) Filed: Nov. 13, 2017

(65) Prior Publication Data
US 2019/0149493 A1    May 16, 2019

(51) Int. Cl.
*H04L 12/58*    (2006.01)
*H04L 29/08*    (2006.01)
*H04W 4/14*    (2009.01)

(52) U.S. Cl.
CPC ............ *H04L 51/063* (2013.01); *H04L 51/06* (2013.01); *H04L 51/066* (2013.01); *H04L 51/10* (2013.01); *H04L 51/18* (2013.01); *H04L 51/38* (2013.01); *H04L 67/22* (2013.01); *H04W 4/14* (2013.01)

(58) Field of Classification Search
CPC .......... H04W 4/14; H04W 4/18; H04L 67/22; H04L 67/24; H04L 51/066; H04L 51/24; H04L 51/10; H04L 51/063; H04L 51/06; H04L 51/38; H04L 51/12; H04L 51/18
See application file for complete search history.

(56) References Cited

U.S. PATENT DOCUMENTS

| | | | |
|---|---|---|---|
| 7,548,755 B2* | 6/2009 | Kim | H04L 51/38 455/466 |
| 9,781,589 B1* | 10/2017 | Posner | H04L 67/141 |

(Continued)

OTHER PUBLICATIONS

"Send Rich Push Notifications", SwifticHelp Center, https://help.swiftic.com/hc/en-us/articles/201583282-Send-Rich-Push-Notifications, Sep. 27, 2017, 8 pgs.

(Continued)

*Primary Examiner* — Gregory G Todd
(74) *Attorney, Agent, or Firm* — Stephanie Carusillo; Maxine L. Barasch; Keohane & D'Alessandro PLLC

(57) ABSTRACT

Disclosed embodiments provide techniques for determining a message type to be sent to an electronic device based on various factors. The factors can include user factors, such as user mood, biometric parameters, user experiences, and/or user preferences. The factors can include device factors, such as battery life, available memory, and/or available data plan quota. Based on the factors, a computerized determination is made as to a message type to be used for electronic communication. The message type can include a text message type, which conserves computer resources. The message type can include a multimedia message type, which may include text, images, audio, video, and/or other content types. The multimedia messages typically consume more computer resources than a text message type, but can provide an enhanced user experience. Disclosed embodiments utilize a variety of factors to determine which message type should be used for a given instance of communication.

16 Claims, 8 Drawing Sheets

(56) References Cited

U.S. PATENT DOCUMENTS

| | | | |
|---|---|---|---|
| 2008/0104393 A1* | 5/2008 | Glasser | G06F 21/6218 |
| | | | 713/165 |
| 2011/0014933 A1* | 1/2011 | Karmarkar | H04M 1/72547 |
| | | | 455/466 |
| 2015/0172236 A1* | 6/2015 | Meijer | G06F 15/16 |
| | | | 709/206 |
| 2016/0286027 A1* | 9/2016 | Lee | H04L 51/066 |
| 2017/0048396 A1 | 2/2017 | O'Connor et al. | |
| 2017/0099592 A1* | 4/2017 | Loeb | H04L 67/303 |
| 2017/0169470 A1 | 6/2017 | DeLuca et al. | |
| 2018/0049688 A1* | 2/2018 | Knight | A61B 5/165 |
| 2018/0176331 A1* | 6/2018 | Jain | H04L 67/327 |

OTHER PUBLICATIONS

Broussard, Mitchel, "Apple Confirms Rich Notifications Will Come to Devices Without 3D Touch", Jun. 14, 2016.

"Download MMS over wifi", https://forum.xda-developers.com/showthread.php?t=2152782, 2013, 7 pgs.

Ortutay, Barbara, "Facebook tracking data, and ads tailored just to you", Jun. 21, 2014, 5 pgs.

"Ios—Do users incur any charges for receiving push notification on iPhones, even if indirectly?" Ask Different, Jan. 30, 2014, 3 pgs.

Andrew, Jacob, "Do Facebook Push Notifications Count as Text Messages?", Jun. 9, 2013, 3 pgs.

* cited by examiner

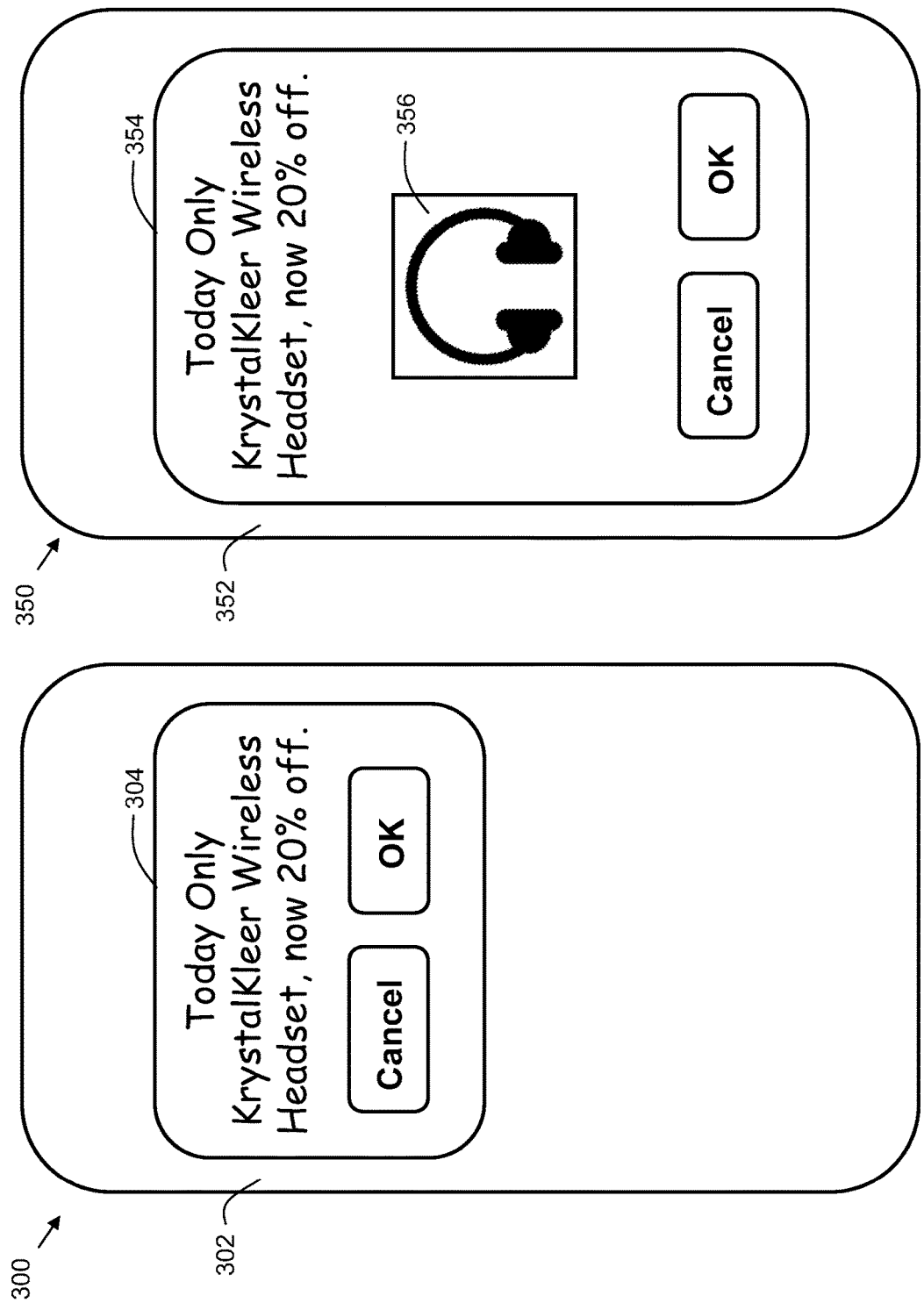

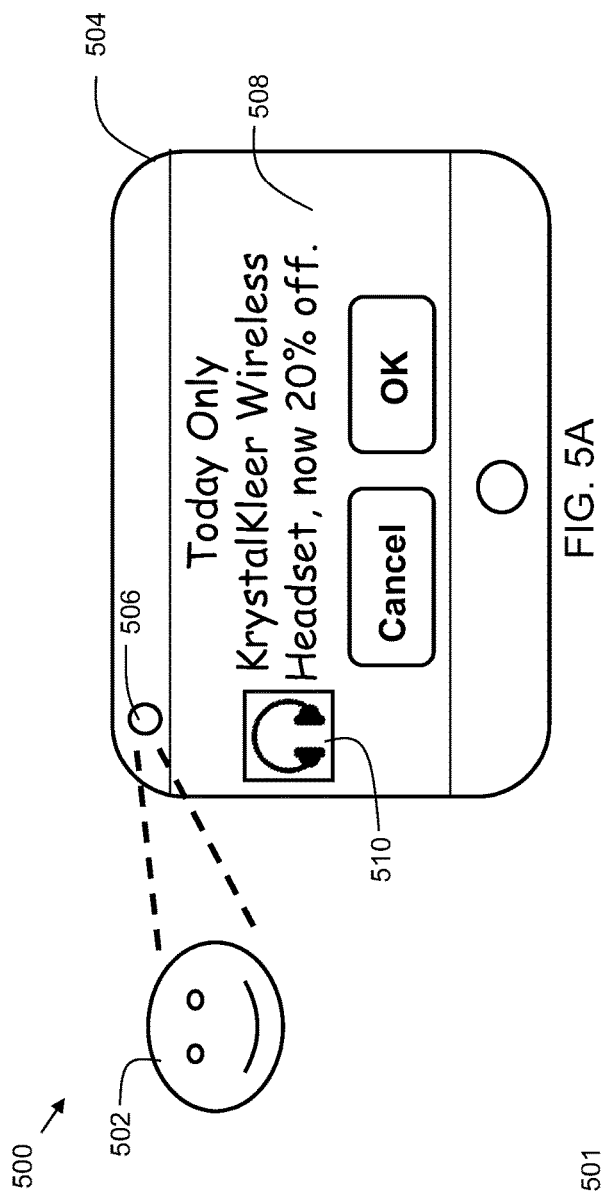
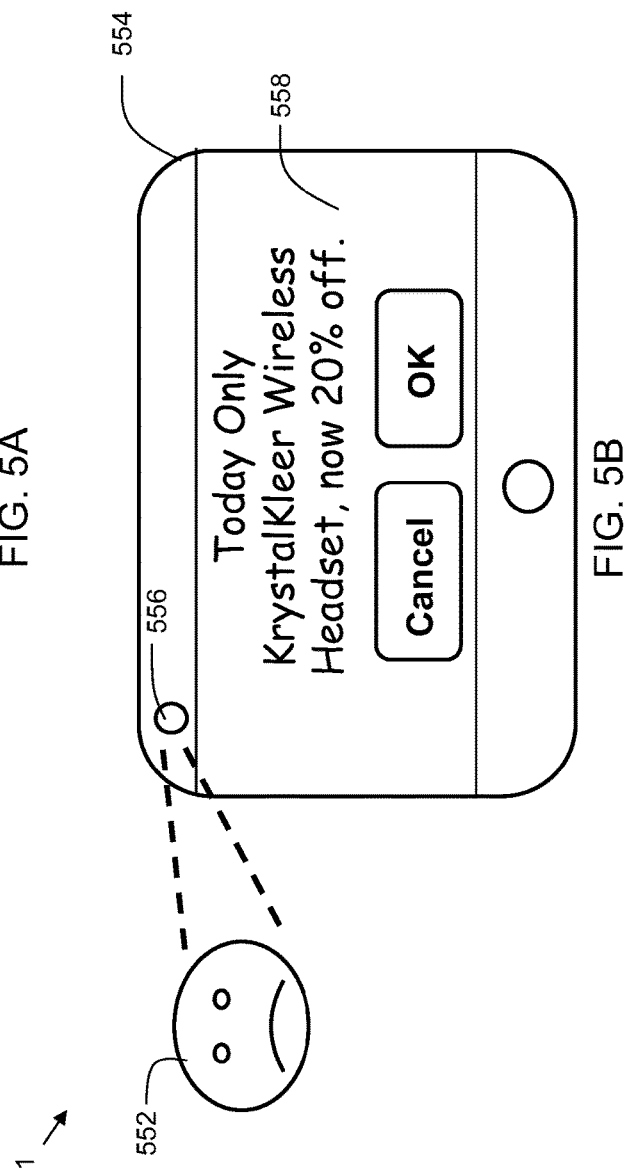

DETERMINATION OF MESSAGE TYPE BASED ON EXTERNAL FACTORS

FIELD OF THE INVENTION

Embodiments of the present invention relate to messaging technology, and more particularly, to determination of message type based on external factors.

BACKGROUND

Various messaging technologies exist today, including SMS, email, instant message, and many others. Some messages are in plain text format, and some may include multimedia. Multimedia messages may include more complex content than plain text (i.e., photos, colors, sounds, videos, or animated images, etc.). Accordingly, multimedia messages can be large and may require a large amount of bandwidth to send and a large amount of memory to store. Additionally, content of multimedia messages may take more time to review by the user and may be more stimulating to the eyes or ears of the user. In some cases, a user may not want to receive multimedia messages. Accordingly, there exists a need for improvements in messaging technologies.

SUMMARY

In one aspect, there is provided a computer-implemented method for electronic communication, comprising: determining, based on one or more external factors, a message type for sending to an electronic device that is associated with a user; obtaining an electronic message of the determined message type; and transmitting the electronic message to the electronic device.

In another aspect, there is provided an electronic communication device comprising: a processor; a memory coupled to the processor, the memory containing instructions, that when executed by the processor, perform the steps of: determining, based on one or more external factors, a message type for sending to a mobile electronic client device that is associated with a user; obtaining an electronic message of the determined message type; and transmitting the electronic message to the mobile electronic client device.

In yet another aspect, there is provided a computer program product for electronic communication, for an electronic computing device comprising a computer readable storage medium having program instructions embodied therewith, the program instructions executable by a processor to cause the electronic computing device to: determine, based on one or more external factors, a message type for sending to a mobile electronic client device that is associated with a user; obtain an electronic message of the determined message type; and transmit the electronic message to the mobile electronic client device.

BRIEF DESCRIPTION OF THE DRAWINGS

Features of the disclosed embodiments will be more readily understood from the following detailed description of the various aspects of the invention taken in conjunction with the accompanying drawings.

FIG. 3A shows an example message of a text type.

FIG. 3B shows an example message of a multimedia type.

FIG. 5A shows an example of a device receiving a message of a multimedia type in accordance with embodiments of the present invention.

FIG. 5B shows an example of a device receiving a message of a text type in accordance with embodiments of the present invention.

Figure 1:
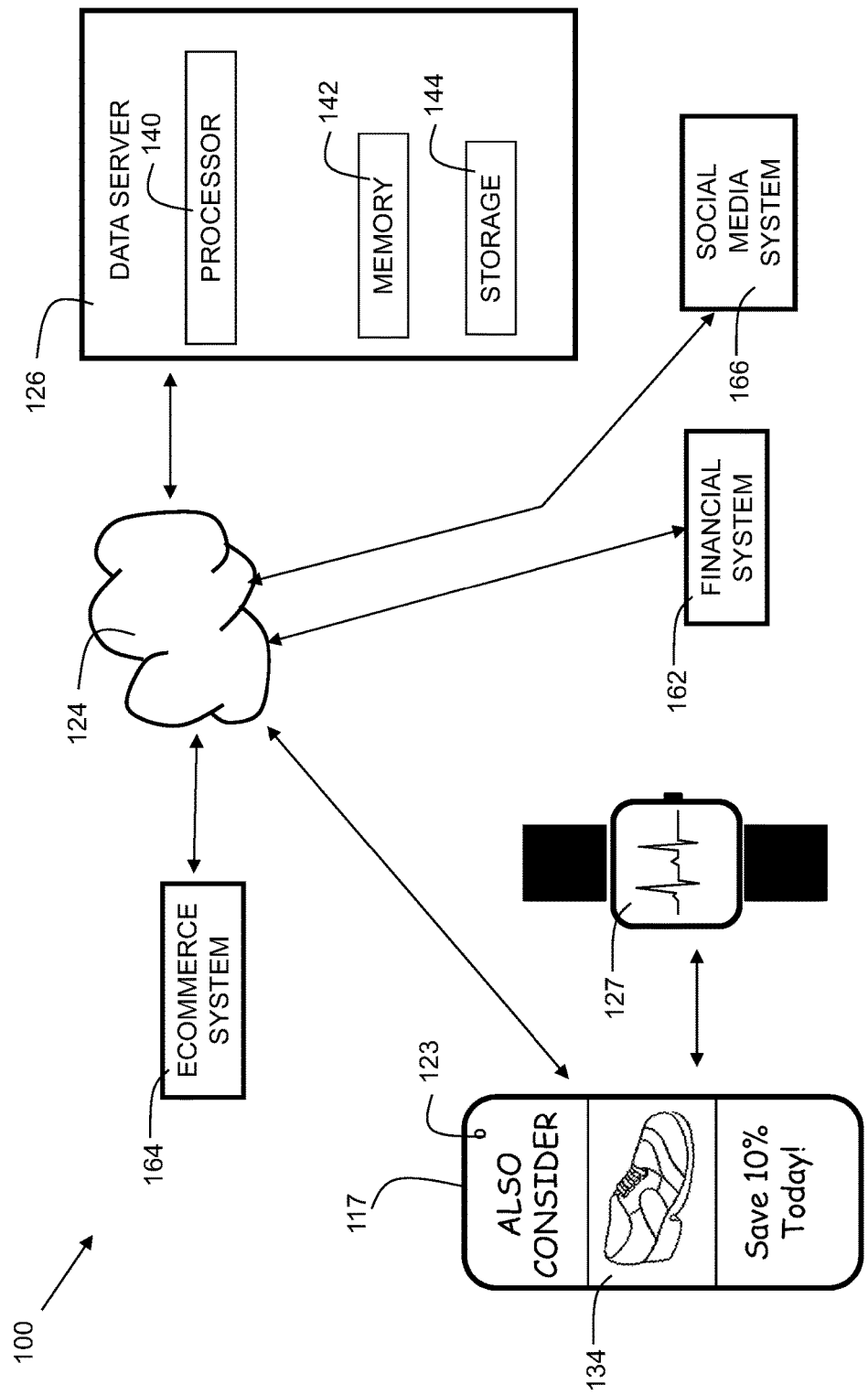
FIG. 1 shows an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for determining a message type to be sent to an electronic device based on various factors. The factors can include user factors, such as user mood, biometric parameters, health parameters, user experiences, and/or user preferences. The factors can include device factors, such as battery life, available memory, and/or available data plan quota. Based on the factors, a computerized determination is made as to a message type to be used for electronic communication. The message type can include a text message type, which conserves computer resources. The message type can include a multimedia message type, which may include text, images, audio, video, and/or other content types. The multimedia messages typically consume more computer resources than a text message type, but can provide an enhanced user experience. Disclosed embodiments utilize a variety of factors to determine which message type should be used for a given instance of communication, thereby serving to make more efficient use of computing resources.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 shows an environment 100 for embodiments of the present invention. A data server 126 includes a processor 140, memory 142, and storage 144. Memory includes instructions, which when executed by the processor, implement elements of the embodiment of the invention. Data server 126 is in communication with network 124, which may be the Internet, a wide area network (WAN), a local area network (LAN), cloud computing network, or other suitable network. Client device 117, ecommerce system 164, financial system 162, and social media system 166 are also in communication with network 124.

Client device 117 may be any suitable electronic device, including, for example, a smartphone, tablet computer, laptop computer, etc. Client device 117 includes a screen 134 and user facing camera 123. A wearable device 127 is in communication with the user electronic device 117 via Bluetooth® or other near-field communication system. The wearable device may be an activity tracker that tracks biometric parameters, such as heart rate, pulse, body temperature, etc. The device 127 may send the data to client device 117 for processing on the client device 117 or sending to server 126.

Ecommerce system 164 may be an online retailer's database. The database may store past purchases made by various people. Accordingly, a user's purchase history may be obtained and/or analyzed from ecommerce system 164.

Financial system 162 may be a record database of a bank, credit union, trading company, or other financial institution. The database may store account information, such as balances and activity, of various clients of the bank or other financial institution. Accordingly, a user's account information may be obtained and/or analyzed from financial system 162.

Social media system 166 may be a social media system and database thereof. The social media system may allow users to post profile information to the user's dedicated social media page, connect the user's account with the accounts of others, and communicate with other users via a messenger. The social media system may acquire a lot of information about users based on their activities on the site. Accordingly, a user's activities may be obtained and/or analyzed from social media system 166.

Figure 2:
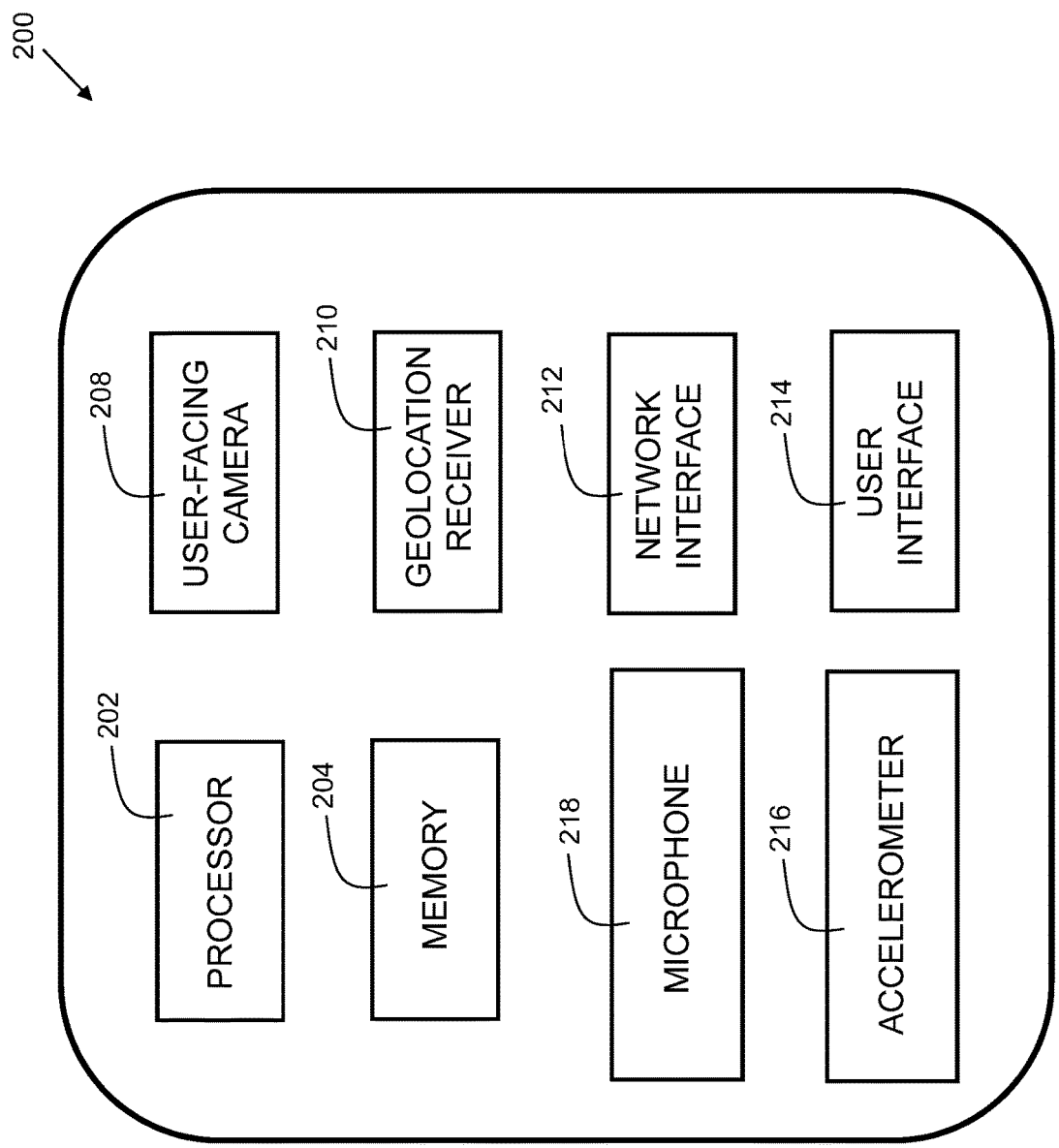
FIG. 2 shows a block diagram of a device in accordance with embodiments of the present invention.

FIG. 2 shows a block diagram of a mobile electronic client device 200 in accordance with embodiments of the present invention. The device 200 includes a processor 202 which is coupled to memory 204. Memory 204 contains instructions, that when executed by the processor 202, perform the various methods in accordance with illustrative embodiments. Device 200 further may include a geolocation receiver 210. The geolocation receiver may be configured to receive signals from multiple satellites to triangulate a position on Earth. In embodiments, the geolocation receiver 210 includes a Global Positioning System (GPS) receiver, GLONASS receiver, Galileo receiver, or other satellite-based positioning system. The device 200 further includes a network interface 212. Network interface 212 may include a cellular network interface, a WiFi interface, such as an IEEE 802.11 interface, or other suitable network interface. Mobile device 200 may further include a user interface 214. User interface 214 may include a touchscreen, and provides a user with the ability to enter information as necessary to utilize embodiments of the present invention. The mobile device 200 may further include an accelerometer 216 which may be used to detect motion of the mobile device, and may serve in the role of location assessment using inertial navigation techniques. The mobile device 200 may include a user-facing camera 208, which faces the user when user is interacting with user interface 214. Still yet, the mobile device may include a microphone 218.

Figure 3C:
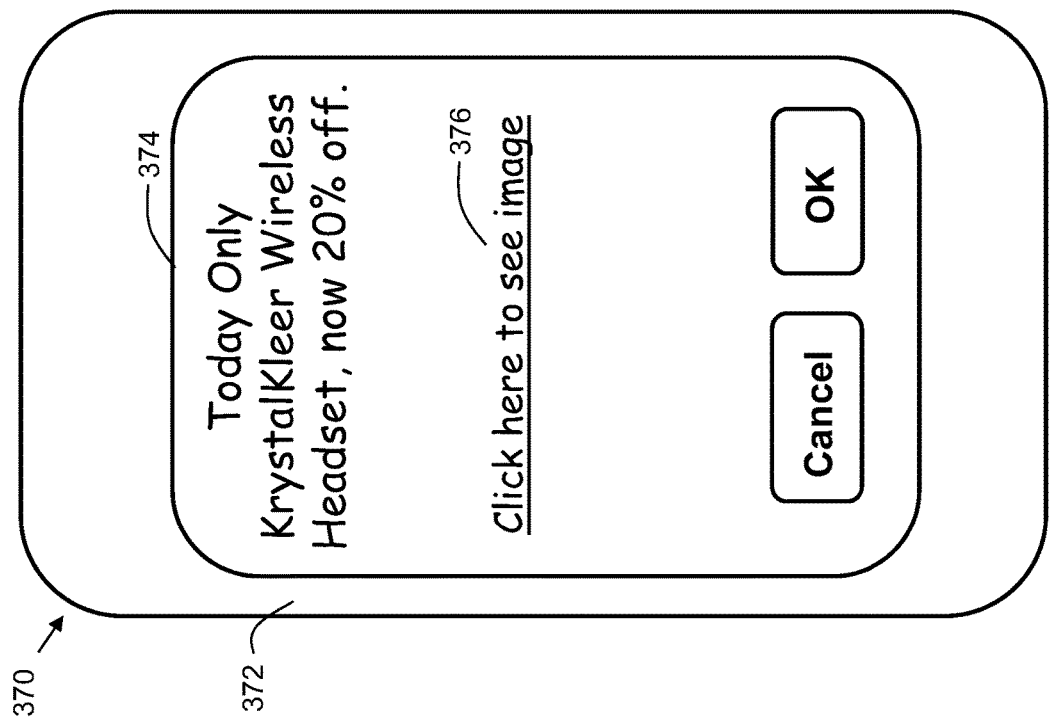
FIG. 3C shows an example message of a text type with a multimedia reference.

FIGS. 3A, 3B, and 3C show examples of messages in accordance with embodiments of the invention. Embodiments of the invention provide a computer-implemented method for electronic communication. Based on one or more external factors, a message type is determined for sending to an electronic device that is associated with a user. In embodiments, the message type may be selected from the group consisting of a text-only message and a multimedia message. An electronic message of the determined message type is obtained. The electronic message is transmitted to the electronic device.

FIG. 3A shows user interface 300 having an example message 302 of a text-only type thereon. This type of message includes text information only. This saves memory, data plan usage, transmission time, etc. In the example, text 304 includes a textual message reciting, "Today Only KrystalKleer Wireless Headset, now 20% off." This kind of message may be a push notification for an ecommerce application.

FIG. 3B shows user interface 350 having an example message 352 of a multimedia type thereon. This type of message may include text, images, audio clips, music files, videos, and other multimedia items. This requires more bandwidth for transmission, more memory to store, and more energy to render (draining battery faster) than a text-only message, but provides improved user experience. In the example, text 354 includes a textual message reciting, "Today Only KrystalKleer Wireless Headset, now 20% off." The message also includes a multimedia image, which in this case includes digital image 356 of the headset that is the subject of the text.

FIG. 3C shows user interface 370 having an example message 372 of a text type with a multimedia reference. This type of message includes text information only, but also includes a reference, such as a link (Uniform Resource Locator), or other unique identifier that references one or more multimedia elements. This saves memory, data plan usage, transmission time, etc. In the example, text 374 includes a textual message reciting, "Today Only KrystalKleer Wireless Headset, now 20% off." This kind of message may be a push notification for an ecommerce application. Reference link 376 may be a hyperlink to an image, web page, video, sound file, or other multimedia element. With this type of message, the resource savings of a text-only message is achieved, while still providing a mechanism for the user to experience the multimedia elements if they chose to do so.

Figure 4:
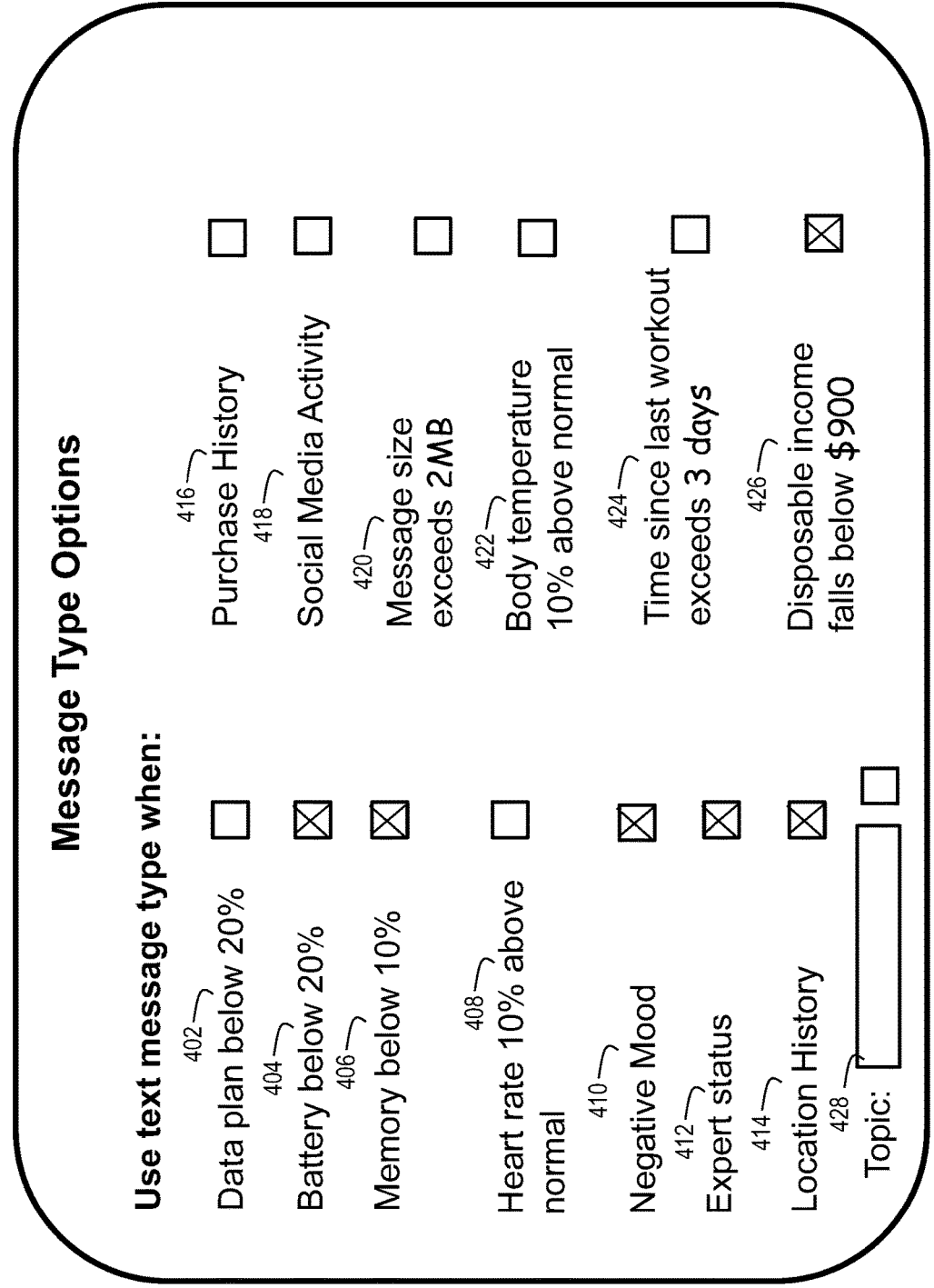
FIG. 4 shows an exemplary user preferences menu in accordance with embodiments of the present invention.

FIG. 4 shows an exemplary user preferences menu 400 in accordance with embodiments of the present invention. A message type is determined based on one or more external factors. In embodiments, the one or more external factors may include a user factor. In embodiments, the user factor may include a user-defined preference. Accordingly, the system may present a menu 400 where the user may set when s/he is to receive a text-only message or multimedia type message based on user selections.

In embodiments, the one or more external factors includes an electronic device factor. In embodiments, the electronic device factor may include estimated available battery life, available memory, or available data for a data plan associated with the electronic device. Thresholds may be set by the user, by selecting the corresponding checkbox (or other suitable mechanism), as follows.

Data plan threshold 402—A text-only message is sent when the remaining data plan quota pertaining to the user's mobile electronic device is below the threshold, which in the example is 20%. This helps preserve data plan resources. Conversely, a multimedia message is sent when the data plan pertaining to the user's mobile electronic device is above the threshold, which in the example is 20%.

Phone battery threshold 404—A text-only message is sent when the battery life of the mobile electronic device is below the threshold, which in the example is 20%. This helps preserve battery life. Conversely, a multimedia message is sent when the battery life of the user's mobile electronic device is above the threshold, which in the example is 20%.

Memory threshold 406—A text-only message is sent when the available memory of the mobile electronic device is below the threshold, which in the example is 10%. This helps preserve memory capacity. Conversely, a multimedia message is sent when the available memory of the user's mobile electronic device is above the threshold, which in the example is 10%.

In some embodiments, the user factor includes a measurement of a biometric parameter. In embodiments, the user factor may include heart rate (pulse), body temperature, or other suitable parameter relating to a user's body. The measurement may be executed by a wearable activity tracker, worn by the user, in communication with the user's mobile device. The threshold may be set as follows.

Biometric threshold 408—A text-only message is sent when a biometric parameter, as indicated by a wearable device, is above the threshold. In the example, the parameter is heart rate, and the threshold is 10% above normal. The user may find it stressful to deal with images when his/her heartrate is up. Another example of a biometric parameter is body temperature, the threshold of which is 10% above normal, at option 422 in the example. If a user is sick, s/he may not be interested in a multimedia message. Conversely, a multimedia message may be sent when the threshold is above 10% as a multimedia message may improve the user's mood, helping him/her to feel better.

In embodiments, the user factor may be any suitable factor. Further examples are as follows.

Mood parameter 410—A text-only message is sent when a mood parameter, as determined by analysis of images captured by user-facing camera, is negative. In the example, a sad or angry mood is considered negative, and a happy mood is considered positive. If a frown is detected, a negative mood is inferred, whereas if a smile is detected, a positive mood is inferred. The user may find it stressful to deal with images when s/he is in a negative mood.

Expert status 412—A text-only message is sent when a user has expert status about a topic relating to the item that is the subject of the message. Whether a user has expert status may be determined by analysis of data from social media system 166 (FIG. 1). The user's profile page, posts, "likes," etc., may be scraped from the system and keywords extracted. The keywords may be compared to keywords pertaining to the topic of the message. If it is determined that a user has posted three or more times using keywords that match the topic, the user may be determined to be an "expert" about such topic. If the user is already an expert, s/he doesn't need to see an image or video. This method is an example, and any method of determining status in relation to a topic is included within the scope of the invention.

Location history 414—A text-only message is sent when a user has visited a particular location previously, as determined by analysis of gel-location history captured by geo-location receiver 210 (FIG. 2), when that location is the subject of the message. If the user has already been to a location, and therefore seen it before, s/he doesn't need to see an image or video.

Purchase history 416—A text-only message is sent when a user has purchased an item previously, as determined by analysis of data from ecommerce system 164 (FIG. 1), when that item is the subject of the message. If the user has already bought the item at least once, and therefore, seen it before, s/he doesn't need to see an image or video.

Social media activity 418—A text-only message is sent when a user has posted on social media previously about an item, as determined by analysis of data from social media system 166 (FIG. 1), when that item is the subject of the message. The user's profile page, posts, "likes," etc., may be scraped from the system 166 and keywords extracted. The keywords may be compared to keywords pertaining to the item that is the topic of the message. If it is determined that a user has posted one or more times using keywords that match the topic (e.g., the name of the item), it may be inferred that the user knows about the item. If the user has already posted about an item, and therefore seen it before, s/he doesn't need to see an image or video. This method is an example, and any method of determining whether a user has posted about a topic is included within the scope of the invention.

Message size threshold 420—A text-only message is sent when the message size of a multi-media type message would be above the threshold, which in the example is 2 MB. This helps preserve memory capacity and reduce transmission time, among other things.

Fitness activity threshold 424—When a user is not getting enough physical activity, s/he may be stressed and not interested in a multimedia message. In some embodiments, this option is represented as a threshold amount of time since the user's last workout (as measured from a wearable activity tracking device). In the example, the threshold is three days. When the user selects this option, a text-only message is sent when the amount of time since the user's last workout is over three days.

Financial threshold 426—When a user is struggling financially, s/he may be stressed and not interested in a multi-media message. In some embodiments, this option is represented as a threshold amount of disposable income in the user's possession (as measured from a user's bank account balance, which may be electronically linked to financial system 162 (FIG. 1). In the example, the threshold is $900. When the user selects this option, a text-only message is sent when the amount of disposable income is less than $900.

The above-identified user factors are examples. Other options are possible, and included within the scope of the invention. For example, a user may specify one or more specific topics to receive the text-only message type. A user may specify the topic at field 428. If the user already knows a lot about shoes, s/he may desire text-only messages when the topic of the message relates to shoes. The system may use natural language analysis, and image analysis, to locate keywords in the text of the message. The system may compare those keywords to an electronic dictionary, or a database, to determine when a topic of a message pertains to a topic specified by the user.

In some embodiments, the user may specify a topic that s/he wants multimedia messages relating to, rather than text-only. The user may use field 428 for such. In some embodiments, the user may specify that s/he wants text-only messages for everything but electronics. The user may think "since I love electronics, I want to see the full multimedia messages for any push notifications pertaining to electronics."

On menu 400, to the right of each option is a check box. The user makes his/her selections by checking the desired boxes, by pressing with a finger or stylus on a touch screen or clicking a button on a mouse. In the example, the user has made multiple selections, including the battery threshold 404, memory threshold 406, mood 410, expert status 412, location history 414, and financial threshold 426. Accordingly, if one or more of such criteria are met, a text-only message will be pushed, rather than a multimedia message.

FIGS. 5A and 5B show examples relating to mood analysis. In some embodiments, the user factor includes a user mood based on a computerized mood analysis of the user. In embodiments, the computerized mood analysis further comprises acquiring a facial image of the user, identifying one or more action units associated with the facial image, and deriving a mood based on the one or more identified action units.

In some embodiments, performing a mood analysis comprises identifying one or more action units in the face image. The Facial Action Coding System (FACS) is a system to classify human facial movements by their appearance on the face. Movements of individual facial muscles are encoded by FACS from slight different instant changes in facial appearance. Using FACS, a computerized method can analyze a wide variety of anatomically possible facial expressions, deconstructing them into the specific Action Units (AU). Using action units, the mood or sentiment of the author of an electronic communication may be derived if a user-facing camera captures images of the user as he/she is composing the electronic communication. For example, AU12 (Lip Corner Puller) is associated with movement of the zygomaticus muscles during a smile. AU02 (Outer Brow Raiser) is associated with movement of the frontalis muscles during a look of surprise. A variety of action units may be combined to infer a given facial expression. Thus, as a user looks at his/her electronic communication device (e.g., smartphone), the user-facing camera on the device can acquire one or more images of the user, perform an action unit (AU) identification process, and infer a mood of the user as the message is being assembled.

FIG. 5A shows an example 500 of a device 504 receiving a message of a multimedia type in accordance with embodiments of the present invention. User facing camera 506 detects user's face 502 is in the view. Based on an analysis of the user's face, it is determined that he is in a positive (i.e., happy) mood. That determination is sent back to server 126 (e.g., using an API, via HTTP, or other suitable mechanism). Therefore, according to the selection at 410 of FIG. 4, a multimedia message 508, including image 510, is sent to the user's phone.

FIG. 5B shows an example 501 of a device 554 receiving a message of a text type in accordance with embodiments of the present invention. User facing camera 556 detects user's face 552 is in the view. Based on an analysis of the user's face, it is determined that he is in a negative (i.e., sad or mad) mood. That determination is sent back to server 126 (e.g., using an API, via HTTP, or other suitable mechanism). Therefore, according to the selection at 410 of FIG. 4, a text-only message 558, without the image 510 of FIG. 5A, is sent to the user's phone.

The examples of FIGS. 5A and 5B are non-limiting. In some embodiments, the scenario could be reversed. A determination of a negative mood could induce a multimedia message, and a positive mood could induce a text-only message. The multimedia message may be sent to "cheer up" the user, especially if the image or video is a positive, uplifting image, like flowers or a beach, or some item determined to be of interest to the user (e.g., determined based on past purchase history).

Figure 6:
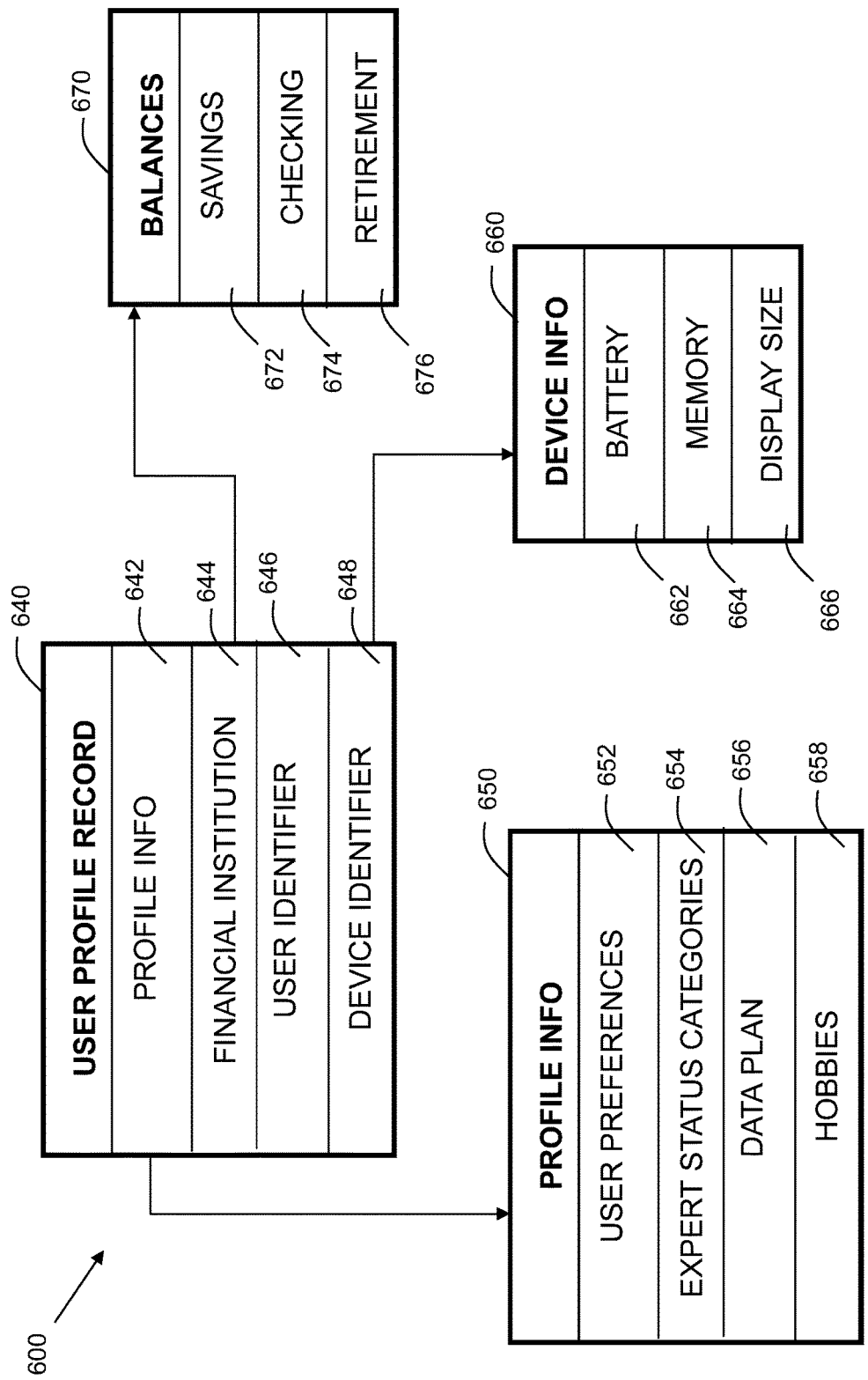
FIG. 6 shows examples of data tables in accordance with embodiments of the present invention.

FIG. 6 shows an example 600 of data tables in accordance with embodiments of the present invention. The data tables may be stored on the server, the user's electronic device, another computer, the cloud, another suitable location, or a combination thereof. The data tables may be implemented as a relational database, a hierarchical database, or any suitable configuration. The data tables could include tables in a relational database such as a Structured Query Language (SQL) database. The data tables may link to other systems (assuming the user grants permission/opts in), such as financial systems. In embodiments, multiple API functions may be provided to query the device information. The API functions may utilize protocols including, but not limited to, HTTP, XML, and/or JSON.

Table 640 includes user profile records. The records may include fields for profile information 642, financial institution 644, user identifier 646, or device identifier 648. User identifier 646 may include a user's name, a social security number, or other suitable identifier. Device identifier 648 may be a MAC address, a Bluetooth® address, a UUID, and/or other suitable identifier of the user's device.

Profile information 642 may be linked to table 650, which includes profile information. Profile information may include user preferences 652, such as the selections at menu 400 (FIG. 4). The profile info may include expert status categories 654, including the topics of which the user is determined to be an expert. Profile info may further include data plan 656, including information (e.g., monthly data quota) about the data plan of the user's electronic device. Profile information may yet further include information about the user's hobbies 658. These may be determined by analysis of social media data of a social media system. Alternatively, they could be manually entered, or the result of scraping the Internet. Any suitable mechanism is included within the scope of the invention.

Financial institution 644 may be linked to table 670, which includes account balance information. This information may be obtained from a bank, trading institution, or other financial organization's records. Field 672 includes a user's savings account balance. Field 674 includes a user's checking account balance. Field 676 includes a user's retirement account balance. These types of accounts are examples, and any suitable accounts or combination thereof are included within the scope of the invention.

Device identifier 648 may be linked to table 660, which includes device information of the user's electronic device. Field 662 includes the available battery life. Field 664 includes the memory availability. Field 666 includes the display size. The display size may be used as a criterion for selecting a message type to use, as in some embodiments, a multimedia may only be sent if the screen of the user's electronic device is above a particular size threshold. When under that threshold, a text-only message may be pushed instead.

Figure 7:
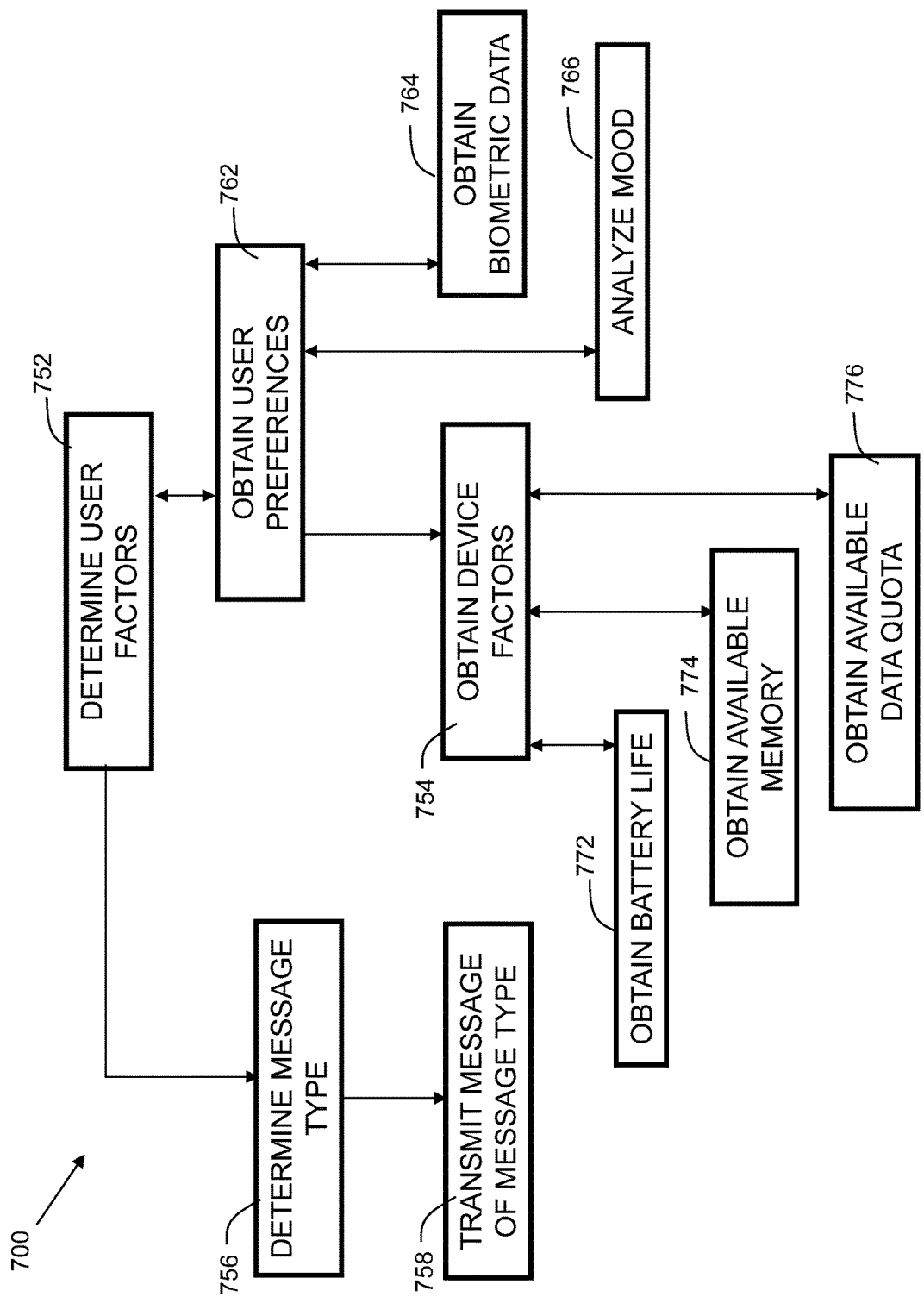
FIG. 7 is a flowchart indicating process steps for embodiments of the present invention.

FIG. 7 is a flowchart 700 indicating process steps for embodiments of the present invention. At 752, user factors are determined (e.g., checking the selections of menu 400). Determining of user factors may include any suitable process, depending on the user selections made. In the example, the following sub-steps of step 752 are executed. At 762, user preferences are obtained. Based on those user preferences, the following sub-steps may be executed. At 764, biometric data is obtained (e.g., from wearable device 127 of FIG. 1). At 766, the user's mood is analyzed (e.g., from images captured from user facing camera 208 of FIG. 2). At 754, device factors are obtained. At 772, battery life is obtained. At 774, available memory is obtained. At 776, available data quota is obtained. Based on the results of these sub-steps, at 756, a message type is determined. At 758, a message of the determined message type is transmitted. In embodiments, more or fewer elements and steps may be included. The steps may be performed in a different order, some steps may be omitted, and/or other steps may be added.

Embodiments of the invention improve the technical field of electronic communication. Using techniques of disclosed embodiments, techniques are provided for determining a message type to be sent to an electronic device based on various factors. The factors can include user factors, such as user mood, biometric parameters, user experiences, and/or user preferences. The factors can include device factors, such as battery life, available memory, and/or available data plan quota. Based on the factors, a computerized determination is made as to a message type to be used for electronic communication. The message type can include a text message type, which, due to its reduced data requirements, conserves computer resources. The message type can include a multimedia message type, which may include text, images, audio, video, and/or other content types. The multimedia messages typically consume more computer resources than a message of a text message type that is conveying similar information. However, the multimedia message can provide an enhanced user experience. Disclosed embodiments utilize a variety of factors to determine which message type should be used for a given instance of communication. In this way, the tradeoff between user experience and computer resources (e.g., bandwidth, battery life, and/or memory usage) can be managed in an improved manner.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for electronic communication, comprising:
  providing, on a user interface, a set including all of external factors as options including each of:
    a data plan threshold;
    a phone battery threshold;
    a memory threshold;
    a biometric parameter threshold;
    a message size threshold;
    a body temperature threshold;
    a time since last workout threshold; and
    a disposable income threshold;
  receiving, from a user, a selection of one or more of the external factors;

obtaining a multimedia electronic message and
transmitting content of the electronic message to the electronic device, wherein a message type of text-only is transmitted when a value of any external factor of the one or more external factors meets a threshold associated with each of the selected one or more external factors, and a message type of multimedia message is selected when the value does not meet the threshold associated with each of the selected one or more external factors.

2. The method of claim 1, wherein the external factors further include a purchase history, and wherein the electronic message type is further based on whether a user has purchased an item previously, as determined by an analysis of data in an ecommerce system, when the item is the subject of the message.

3. The method of claim 1, wherein the external factors further include a location history, and wherein the electronic message type is further based on whether a user has visited a location previously, as determined by an analysis of geo-location history captured by a geolocation receiver, when the location is the subject of the message.

4. The method of claim 1, wherein the external factors further include a social media activity, and wherein the electronic message type is further based on whether a user has posted on social media about an item previously, when the item is the subject of the message.

5. The method of claim 1, wherein the biometric parameter threshold includes body temperature.

6. The method of claim 1, wherein the biometric parameter threshold includes heart rate.

7. The method of claim 1, wherein the phone battery threshold is based on estimated available battery life.

8. The method of claim 1, wherein the memory threshold is based on available memory.

9. The method of claim 1, wherein the data plan threshold is based on available data for a data plan associated with the electronic device.

10. An electronic communication device comprising:
a processor;
a memory coupled to the processor, the memory containing instructions, that when executed by the processor, perform the steps of:
providing, on a user interface, a set of external factors as options including each of:
a data plan threshold;
a phone battery threshold;
a memory threshold;
a biometric parameter threshold;
a message size threshold;
a body temperature threshold;
a time since last workout threshold; and
a disposable income threshold;
receiving, from a user, a selection of one or more of the external factors;
obtaining a multimedia electronic message and
transmitting content of the electronic message to the electronic device, wherein a message type of text-only is transmitted when a value of any external factor of the one or more external factors meets a threshold associated with each of the selected one or more external factors, and a message type of multimedia message is selected when the value does not meet the threshold associated with each of the selected one or more external factors.

11. The electronic communication device of claim 10, wherein the set of external factors further includes as an option a purchase history, and wherein the electronic message type is further based on whether a user has purchased an item previously, as determined by an analysis of data in an ecommerce system, when the item is the subject of the message.

12. The electronic communication device of claim 10, wherein the set of external factors further includes as an option a location history, and wherein the electronic message type is further based on whether a user has visited a location previously, as determined by an analysis of geo-location history captured by a geolocation receiver, when the location is the subject of the message.

13. The electronic communication device of claim 10, wherein the set of external factors further includes as an option a social media activity, and wherein the electronic message type is further based on whether a user has posted on social media about an item previously, when the item is the subject of the message.

14. A computer program product for electronic communication, for an electronic computing device comprising a computer readable storage device having program instructions embodied therewith, the program instructions executable by a processor to cause the electronic computing device to:
provide, on a user interface, a set of external factors as options including each of:
a data plan threshold;
a phone battery threshold;
a memory threshold;
a biometric parameter threshold;
a message size threshold;
a body temperature threshold;
a time since last workout threshold; and
a disposable income threshold;
receive, from a user, a selection of one or more of the external factors;
obtaining a multimedia electronic message and
transmitting content of the electronic message to the electronic device, wherein a message type of text-only is transmitted when a value of any external factor of the one or more external factors meets a threshold associated with each of the selected one or more external factors, and a message type of multimedia message is selected when the value does not meet the threshold associated with each of the selected one or more external factors.

15. The computer program product of claim 14, wherein the set of external factors further includes as an option a purchase history, and wherein the electronic message type is further based on whether a user has purchased an item previously, as determined by an analysis of data in an ecommerce system, when the item is the subject of the message.

16. The computer program product of claim 14, wherein the set of external factors further includes as an option a location history, and wherein the electronic message type is further based on whether a user has visited a location previously, as determined by an analysis of geo-location history captured by a geolocation receiver, when the location is the subject of the message.

\* \* \* \* \*